April 5, 1932.  E. C. HEAD  1,852,775

WORM GEARING

Filed March 19, 1931

INVENTOR
Ernest C. Head
BY
his ATTORNEY

Patented Apr. 5, 1932

1,852,775

UNITED STATES PATENT OFFICE

ERNEST C. HEAD, OF ROCHESTER, NEW YORK, ASSIGNOR TO GLEASON WORKS, OF ROCHESTER, NEW YORK, A CORPORATION OF NEW YORK

WORM GEARING

Application filed March 19, 1931. Serial No. 523,737.

The present invention relates to worm gearing and the purpose of the invention is to provide a worm gear pair in which the worm is capable of axial adjustment and in which any desired amount of tooth bearing is obtainable.

In the ordinary worm gear pair, the worm thread is of constant pitch and of uniform pressure angle from one end to the other and the wheel is cut with a hob similar in construction to the worm and representing the worm exactly. Thus, the threads of the worm and the teeth of the wheel match each other in pressure angle and there is no way of changing or controlling the profile bearing.

In a pair cut according to the present invention, the worm thread has a different pressure angle at different points along its length, preferably being made of constantly changing pressure angle from one end to the other, but with the pressure angle changing in opposite sense on its two sides. Because of this construction, when the worm is in mesh with a worm wheel it will be capable of axial adjustment and through its adjustment, the profile bearing can be changed and controlled. Moreover, by properly selecting the pressure angle at various points along the length of the worm thread, any desired localization or amount of tooth profile bearing can be obtained between the sides of the worm thread and the sides of the worm wheel teeth.

There is another important advantage to be obtained through the present invention. A pair can be cut and then run together on center on a gear testing machine. The tooth bearing will be observed and if not satisfactory, the worm will be adjusted until the desired tooth bearing is obtained. Then the worm cutting machine will be readjusted to compensate for the change of axial position of the test worm required to give a satisfactory bearing and so produce a worm which will run on center with the desired bearing. Further by testing the pairs cut on different machines, all worm and wheel cutting machines cutting a particular pair can be adjusted to produce a uniform product with resultant interchangeability.

The invention is characterized by other features of real practical value. Thus, manufacturing tolerances can be broadened and it is not necessary to adhere to those same fine forms of accuracy required in the manufacture of the conventional type of worm gearing. Moreover, a worm gear pair is provided which is capable of use under varying conditions of mounting and load.

Figure 1:
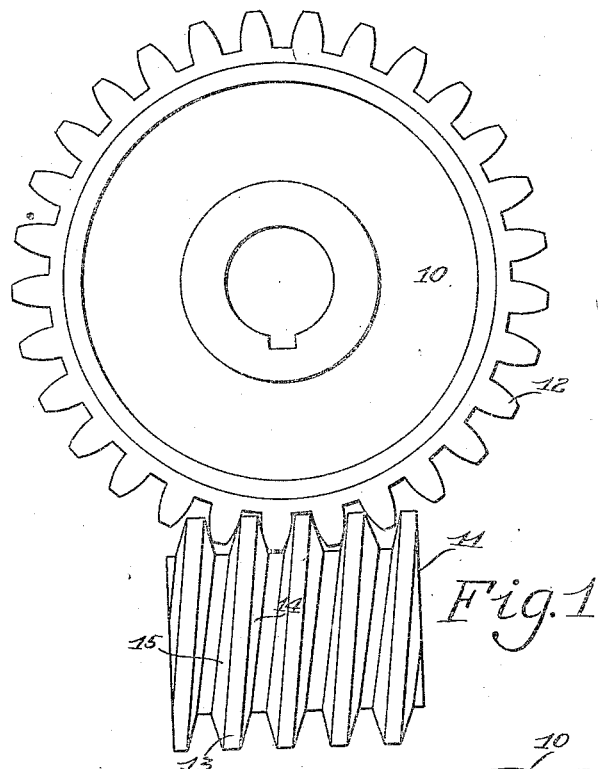
Figure 1 is an elevational view of a worm gear drive constructed according to the present invention.
Figure 2:
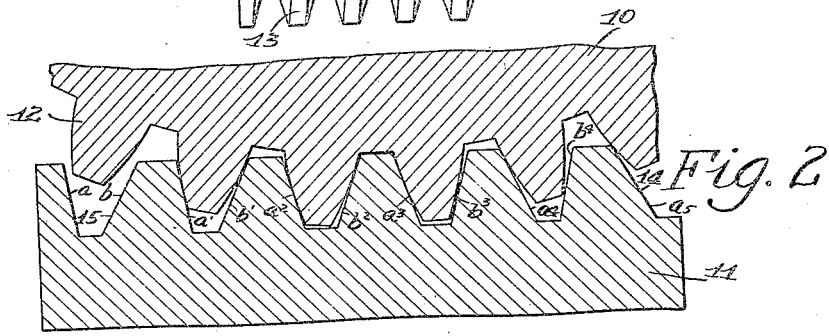
Figure 2 is a fragmentary sectional view of the worm and gear.

In the drawings, 10 indicates the worm wheel and 11 the worm of a gear pair constructed according to this invention. The worm wheel 10 is similar in construction to worm wheels of the conventional type, having a plurality of teeth 12 identical with one another. In the embodiment of the invention shown in the drawings, the worm 11 has a continuous thread 13 arranged in a plurality of convolutions and the sides of this thread are of changing pressure angle from one end to the other, the change being in opposite sense on the opposite sides of the thread. Thus the pressure angle of the side 14 of the thread increases from left to right, while the pressure angle of the side 15 of the thread decreases from left to right. The pressure angle at $a$ is less than at $a'$ which in turn is less than at $a^2$ and so on, the pressure angle at $a^5$ for the side 14 of the thread being at a maximum. On the other side 15 of the thread, the pressure angle at $b$ is at a maximum and at $b^4$ at the minimum, the pressure angles varying between these two points. It will be noted that at a point midway the length of the thread 13, the pressure angles $a^3$ and $b^2$ of opposite sides of the thread may be equal.

Figure 3:
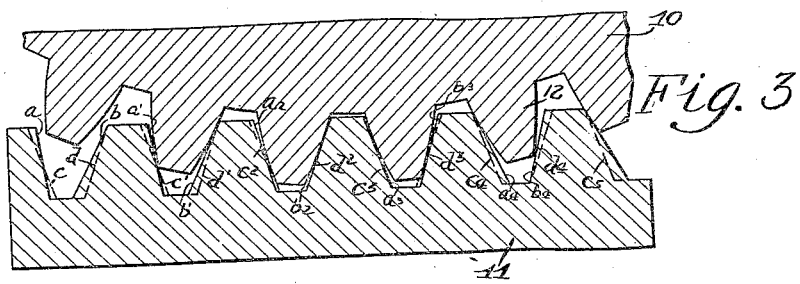
Figure 3 is a view similar to Figure 2, showing particularly how a worm made according to the present invention compares in structure with the conventional type of worm.

Figure 3 shows the result obtained by forming a worm thread in the manner described. In this figure, the dotted lines $c$, $c^1$, $c^2$, etc. designate portions of one side and the dotted lines $d$, $d^1$, $d^2$, etc., portions of the opposite side of a thread of a conventional worm of uniform pressure angle which like the worm 11, will also mesh with the worm wheel 10. It will be noted that at the points $b^2$ and $b^3$, the conventional thread will coincide with the thread of the improved type of worm constructed according to this invention but that away from these central points, the sides of the thread of my new worm incline in one direction or the other away from the sides of a conventional worm. It will be noted, moreover, that because of its construction the points of contact of the sides of the thread of my improved worm with the sides of the teeth 12 of the worm wheel 10 will be different, at different points along the length of the thread 13, from the points of contact of the sides of a conventional worm with the sides of the teeth 12. It will be seen, then, that through my invention it is possible to obtain any desirable amount or localization of profile contact or tooth bearing by suitably varying the pressure angle of the worm thread at different points along its length.

It will be seen, also, that due to the change in pressure angle of the worm thread from one end to the other, the worm can be adjusted axially to modify the tooth bearing. Thus, the advantages pointed out above in the production of worms and worm wheels can be obtained.

Figure 4:
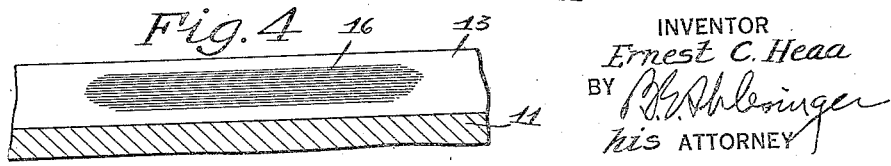
Figure 4 is a development of the thread of a worm cut according to the present invention, showing the form of tooth bearing or contact obtained when such a worm is in mesh with its mate worm wheel.

Figure 4 shows the development of the one side of the thread 13 of a worm constructed according to this invention, illustrating how by suitably varying the pressure angle of the worm thread, a desirable type of tooth bearing with a desirable localization thereof can be obtained, as indicated by the shaded portion 16 of the side of the worm thread. In the ordinary pair, the bearing at the ends of the worm is small and the unit pressure on the worm thread correspondingly high. In the improved pair, a larger bearing area is obtainable with a more even distribution of pressure over the whole length of the worm thread. This tends to reduce wear and lengthen the life of the pair as compared with an ordinary pair.

A worm of my improved type can be cut by tipping a lathe-tool as it moves from one end of the worm to the other, during the turning of the thread of the worm. To produce a worm such as shown in the drawings, the lathe tool will be tilted in opposite directions during the turning of the opposite sides of the thread. The worm wheel may be cut by a hob having a varying pressure angle, the same as the worm or it may be cut with a conventional hob whose pressure angle is constant from one end to the other. It will be understood, that I do not desire to limit my invention to the particular type of worm shown in the drawings, for I have in mind that the pressure angle of the worm and thread may be modified, at will, to meet varying conditions under which different worm gear pairs may be used.

The invention has been illustrated in connection with a particular embodiment, but it will be understood that it is capable of considerable modification within its scope and this application is intended to cover any adaptations, or embodiments of the invention following, in general, the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. A pair of gears comprising a worm wheel having a plurality of identical teeth and a worm, the sides of whose thread are of varying pressure angle from one end to the other.

2. A pair of gears comprising a worm wheel having a pluraity of identical teeth and a worm, one side of whose thread increases in pressure angle from one end to the other and the other side of whose thread, considered in the same direction axially of the worm, decreases in pressure angle from one end to the other.

3. A pair of gears comprising a worm wheel having a plurality of identical teeth and a worm, the sides of whose thread are of different pressure angles at different points along its length.

4. A pair of gears comprising a worm wheel having a plurality of identical teeth and a worm whose thread at a point midway its length is of the same pressure angle on opposite sides but at other points along its length is of different pressure angle on opposite sides.

5. A cylindrical worm, the sides of whose thread are of varying pressure angle from one end of the worm to the other.

6. A cylindrical worm, one side of whose thread increases in pressure angle from one end to the other and the other side of whose thread considered in the same direction decreases in pressure angle.

7. A cylindrical worm, the sides of whose thread are of different pressure angles at different points along its length.

ERNEST C. HEAD.